United States Patent

[11] 3,629,026

| [72] | Inventors | Allan B. Isham<br>Newark;<br>Wilbur Shenk, III, Granville, both of Ohio |
|---|---|---|
| [21] | Appl. No. | 747,645 |
| [22] | Filed | July 25, 1968 |
| [45] | Patented | Dec. 21, 1971 |
| [73] | Assignee | Owens-Corning Fiberglas Corporation |

[54] METHOD FOR REINFORCING A THERMOPLASTIC ARTICLE
7 Claims, 7 Drawing Figs.

[52] U.S. Cl. .................................................. 156/161,
156/162, 161/84, 156/308
[51] Int. Cl. ..................................................... C09j 5/00
[50] Field of Search........................................... 156/308,
161, 162; 161/84, 178 US

[56] References Cited
UNITED STATES PATENTS
3,252,278  5/1966  Marzocchi et al. ............. 156/308 X 3,441,465  4/1969  Pearson........................ 161/84

FOREIGN PATENTS

| 770,539 | 3/1957 | Great Britain................ | 156/305 |
| 907,768 | 10/1962 | Great Britain................ | 156/308 |
| 956,328 | 4/1964 | Great Britain................ | 156/305 |
| 79,171 | 9/1962 | France ........................ | 156/305 |
| 1,245,375 | 8/1960 | France ........................ | 156/305 |
| 453,274 | 12/1948 | Canada ....................... | 161/84 |

Primary Examiner—Reuben Epstein
Attorneys—Staelin & Overman and Daniel D. Mast

ABSTRACT: A method of reinforcing thermoplastic structures by controllably overwrapping the structures with continuous glass strands impregnated with a solvent solution of a thermoplastic resin whereby the outside surface of the structure is attacked by the solvent to fuse the impregnated strands to the thermoplastic structure, thereby creating an integrally reinforced structure having no interface between the thermoplastic structure and the thermoplastic resin impregnant and having the strands locked in the structure.

ALLAN B. ISHAM &
WILBUR SHENK, III
INVENTORS

METHOD FOR REINFORCING A THERMOPLASTIC ARTICLE

BACKGROUND OF THE INVENTION

This invention relates to the reinforcement of previously processed thermoplastic structures, in particular thermoplastic tubing.

In the past, makers of thermoplastic pipe have sought to improve the strength and long term performance thereof by winding impregnated glass filaments thereon and by laminating glass-containing materials thereto. However, previously processed thermoplastic structures subsequently reinforced with glass, have not been entirely satisfactory because no suitable method has been devised to achieve and maintain a high-strength bond between the impregnated glass filaments and the thermoplastic.

In U.S. Pat. No. 3,002,534, a water-resistant, glass-reinforced thermoplastic material was made by bonding glass fibers, impregnated with a thermosetting resin, to a thermoplastic pipe with a curable bonding adhesive. This method greatly enhanced the properties of thermoplastic pipe but it still had inherent drawbacks, i.e. the creation of two separate interfaces which are subject to their bond being broken, thereby leading to failure within the pipe. When thermoplastic tubing is reinforced according to our inventive concepts, an improved product is formed whereby the glass reinforcement actually becomes an integral part of the thermoplastic tubing, so that there is substantially no interface between the thermoplastic impregnant for the reinforcement and the thermoplastic tubing.

It is therefore an object of the present invention to provide a method for reinforcing previously processed thermoplastic structures, specifically thermoplastic tubing, with impregnated continuous glass fibers.

A further object of provision of a product, comprising impregnated glass filaments wrapped about and bonded to thermoplastic tubing having greatly improved properties.

A still further object is the provision of a thermoplastic solvent solution resin impregnant system suitable for attaching thermoplastic structure and subsequently evaporating, so that a homogenous thermoplastic matrix is formed which houses the glass reinforcement.

Other objects and advantages will be apparent from the description which follows, which is intended only to illustrate and disclose, and not to limit, the invention.

SUMMARY OF THE INVENTION

When previously processed thermoplastic articles are reinforced according to the inventive concepts herein, an integrally reinforced structure is formed by the action of a thermoplastic solvent solution resin, which is used as an impregnant for glass filaments, with the thermoplastic article. The thermoplastic solvent solution resin partially dissolves and takes into solution some of the thermoplastic from the unreinforced article. By so doing the thermoplastic impregnant substantially eliminates the normal interface present in overwrapped structures, because there is a fusing between the thermoplastic impregnant and the thermoplastic article which forms a homogenous thermoplastic matrix.

Specifically, when continuous glass fiber roving* is impregnated with a thermoplastic solvent solution resin and while wet with impregnant is wound about or placed upon thermoplastic structures to be reinforced, the solvent in the impregnant controllably attacks the thermoplastic structure and at substantially the same time evaporates. The degree of solvent attack on the thermoplastic structures is controlled in part by the evaporation rate or the solvent strength of the solvent, temperature, etc. The end result is a thermoplastic structure reinforced with thermoplastic resin impregnated glass filaments.

Some of the glass filaments from the impregnated roving become imbedded in the structure to be reinforced. The degree of imbedding is mainly dependent upon the pressure of the reinforcement when applied to the structure.

*The term "roving" as used in herein and in the art, includes threads, yarns, and equivalent textile elements, as well as untwisted or slightly twisted bundles of substantially parallel fibers or filaments.

Sometimes it is advantageous to impregnate glass fiber rovings with out thermoplastic solvent solution resin and allow the solvent to evaporate therefrom, thereby leaving a dried deposit of the thermoplastic within the roving. This is called a preimpregnated roving. This preimpregnated roving is wound on spools and stored for future use. Thermoplastic tubing can then be reinforced using one inventive concept by passing this preimpregnated roving through a solvent bath or a solvent solution resin just prior to application to the unreinforced tubing. Heat may be applied to the preimpregnated roving to facilitate application.

The advantages of using such a system is that there is complete compatibility between the impregnated glass and the thermoplastic structure, whereas prior art shows the use of a thermosetting resin as the glass fiber impregnant and a bonding adhesive between the impregnated glass and the thermoplastic structure, so that in the former a substantially homogeneous thermoplastic matrix results and in the latter, the system is dependent upon the bond strength supplied by the adhesive. Another advantage of using the inventive system to reinforce thermoplastic tubing is that no heat curing of the thermoplastic solvent solution resin is required since it contains a high percentage of solvent and thereby evaporates almost instantaneously.

Our typical thermoplastic solvent solution resins comprise from about 20–50 percent by weight solids and from about 50–80 percent by weight of solvent. Since only some of the thermoplastic resins that are solvent weldable were commercially available, the inventive concept was directed primarily to those having commercial interest with tubings, i.e. acrylonitrile-butadine-styrene, polyvinyl chloride, chlorinated polyvinyl chloride, vinyl copolymers, and alloys of acrylonitrile-butadine-styrene and vinyl resins.

Any organic solvent that takes thermoplastic resin into solution may be used in our invention. Examples of these solvents are methyl ethyl ketone, methyl isobutyl ketone, ethylene dichloride, various esters, and miscellaneous active solvents.

When a fibrous glass overwrap is solvent welded or fused to a thermoplastic tubing, a synergistic effect is produced, i.e. glass-overwrapped thermoplastic tubing utilizes the best inherent property of each component material to form a product that exhibits better properties than if constructed solely from one of the components. By combining the long term impermeability of thermoplastic and the strengths of glass fibers, each of the respective weakness of these materials are also overcome.

In an unlined tubing constructed solely from glass reinforcements and thermosetting resins, i.e. epoxy, polyester, etc., failure therein, described as weeping, may occur, where weeping is defined as the transmission of pressurized gas or fluid through the wall of the tubing without a visible fracture. Weeping in tubing indicates that bonding between glass fibers and the plastic matrix has broken down and/or the matrix has cracked, but does not indicate that the glass fibers have failed.

When tubing is constructed solely of thermoplastic material a weakness therein is its relatively low strength and poor creep resistance, especially at elevated temperatures. Creep is defined as the degree of permanent change in shape from prolonged stress or exposure to high temperature.

However, weeping and creep characteristics are overcome when a thermoplastic tubing is treated according to the inventive concepts herein, by putting to use the best properties of the glass fiber reinforcement and the thermoplastic material.

Another property that is greatly improved upon when thermoplastic tubing is treated according to our inventive concepts is burst strength. This property is defined as the internal pressure in a tube at which failure occurs under short term loading. Our glass overwrap thermoplastic structure relies on the original thermoplastic tubing for good weep properties and upon the glass to reduce creep and to increase burst strength.

Tubing constructed according to the present invention has a lower coefficient of thermal expansion than tubing that is unreinforced. This lower coefficient of thermal expansion is attributed to the glass in the overwrap. This is advantageous in that it eliminates the need for expensive expansion joints and loops in a piping system. Our reinforced tubing in comparison to unreinforced tubing increases hoop and beam stiffness. The increased stiffness in the circumferential direction gives the thermoplastic tubing greater resistance to external crushing loads. The increased beam stiffness allows hanger spacing to be increased and/or sag reduction in an application where thermoplastic pipe is suspended overhead.

Another advantage of using tubing reinforced by the inventive concepts in comparison to unreinforced tubing is that it tends to eliminate brittle-type failures common to polyvinyl chloride and acrylonitrile-butadine-styrene materials at low temperatures, because the overwrap prevents longitudinal splitting by localizing the failure. Still another advantage in the inventive concept over unreinforced tubing is that the thermoplastic glass fiber matrix reinforcement is more resistant to cracking than the thermoplastic glass fiber matrices used to date. This is the result of higher elongation characteristics inherent with thermoplastic materials compared to the currently used thermosetting resins.

A further advantage in using the inventive system over unreinforced tubing is that through simplicity and use of only a small number of intermediates, operating and materials costs are greatly reduced over the prior art systems. When tubing is constructed by the inventive concept on a discontinuous basis, the glass fiber roving is impregnated with a thermoplastic solvent solution resin. Immediately after the continuous glass fiber roving is impregnated, it is wound on a rotating thermoplastic tubing by simply traversing the impregnated glass roving along the length of the tubing. As soon as the impregnated glass roving comes into contact contact with the tubing, the solvent in the impregnant immediately begins to attack the original outside surface of the thermoplastic tubing, while at the same time the glass roving partially imbeds itself into the tubing. The solvent evaporates while the thermoplastic solids in the impregnant remain, thereby encapsulating the glass fibers within a thermoplastic matrix. Drying of the structure takes place quickly at room temperature. Because of the solvent attack on the thermoplastic tubing, the original interface that normally exists between an impregnant for a glass overwrap and the tubing vanishes, whereby the impregnated overwrap essentially becomes an integral part of the original thermoplastic pipe.

Since there is solvent fusing between the thermoplastic impregnant and the thermoplastic structure to form a homogenous matrix, there is no interface present in the thermoplastic matrices, although there is still an interface between the glass and the thermoplastic matrices.

A suitable impregnant must meet four criteria: (1) it must be compatible with the thermoplastic article in order to obtain a strong bond, bonding within the use of an adhesive to hold the impregnant to the tubing, (2) the solids content must be high enough so that after the solvent component evaporates the glass overwrap is protected and bonded to the tubing, (3) the viscosity must be low enough in order to allow the impregnated glass fibers to be filament wound with conventional techniques and equipment or to be used in standard laminating techniques, and (4) the drying rate (rate of solvent evaporation) must be low enough so that the impregnated glass fibers are not dry before they contact the article, and yet not so low that excess drying time is required.

The solvents must meet three criteria: (1) exhibit ability to dissolve sufficient amounts of thermoplastic resin into solution, (2) exhibit the ability to attack the thermoplastic article to be reinforced, and (3) exhibit ability to evaporate quickly from the impregnant without being entrapped wherein.

Diluent solvents may be used in the thermoplastic solvent solution resin to alter the evaporation rate of the resin. Suitable solvents for the acrylonitrile-butadine-styrene system were found to be methyl ethyl ketone and methyl isobutyl ketone; suitable solvents for the polyvinyl chloride system where found to be tetra hydrofuran, cyclohexanone, methyl ethyl ketone, methyl isobutyl ketone and dimethyl formamide, and combinations thereof.

Incorporation of a filler, such as clay, asbestos fibers, or milled glass fibers, etc. to the thermoplastic solvent solution resin aids in solvent evaporation and thereby prevents "blister" formation on the reinforced article which is usually caused by entrapped solvents, It is thought that the fillers, when incorporated in the impregnant, provide passageways from the interior of the overwrap to the exterior for the evaporating solvents.

It was discovered that the thermoplastic resins for use in the impregnant system did not have to be of the same type and grade as that of the thermoplastic article for optimum compatibility; therefore, various copolymers such as vinyl acetate copolymer, and modifications thereof may be used in the impregnant system, for reinforcing polyvinyl chloride articles.

The glass reinforcements may consist of glass fibers in any continuous form, i.e. continuous roving, continuous textile, continuous strips of woven roving fabric, continuous strips of woven textile fabric, and continuous strips of chopped strand mat. When the thermoplastic structure to be reinforced is in sheet form, continuous lengths of glass fabric, continuous strand mat, nonwoven glass mat or woven glass robing is preferable as the reinforcement.

It is preferable to use glass reinforcement treated with a substance that demonstrated compatibility with the impregnant system, such as organo silanes, A preferred silane is gamma-aminopropyltriethoxysilane, wherein some degree of coordination is provided between the glass and the thermoplastic matrix. Other organosilanes for use as surface treatments on the glass reinforcement prior to being impregnated were:

gamma-Methacryloxypropyltrimethoxysilane
gamma-Glycidoxypropyltrimethoxysilane
N-bis(beta-Hydroxyethyl) gamma-aminopropyltriethoxysilane
N-Beta-(Aminoethyl)-gamma-aminopropyltrimethoxysilane
beta-(3,4-Epoxycyclohexy)-ethyltrimethyoxysilane
Vinyl-tris (beta-methoxyethoxy)silane
Vinyltrichlororsilane
Vinyltriethoxysilane
Vinyltriacetoxysilane
N-(Dimethoxy methylsilylisobutyl) ethylenediamine
Methyltrimethoxysilane
Phenyltrimethoxysilane
Dimethyldimethoxysilane
Methylphenyldimethoxysilane
Diphenyldimethoxysilane
gamma-Chloropropyltrimethoxysilane
trimethylmercaptotrimethoxysilane
methyl3[3(trimethoxysilzlpropyl)2-
    aminoethylamino]propionate It is also preferable to have the glass-resin overwrap in its dried state comprising from about 45 to about 65 percent by volume of glass.

An important criteria that must be met, in order to use conventional equipment and to maintain the glass reinforcement in a stable relationship with the article to be reinforced, is the solids-viscosity relationship of the impregnant. Generally, there is a direct proportional relationship between the two properties, i.e. as the solids are increased, so is the viscosity of the impregnant. In order to reach a suitable balance between solids and viscosity then, care must be exhibited in the selection of the solvent to cut the thermoplastic resin into solutions. In the acrylonitrile-butadiene-styrene system, it was found that by controlling the solids in the impregnant at from about 20 to about 40 percent by weight, the viscosity ranged from about 1,000 to about 10,000 centipoise, when a 1:1 ratio of methyl ethyl ketone:methyl isobutyl ketone was used as the solvent. With this system, standard filament winding or laminating equipment was used to obtain a glass reinforced structure.

The inventive concept herein is applicable to thermoplastic sheeting as well as to thermoplastic tubing. Continuous thermoplastic sheeting is reinforced with woven roving, woven textile fabric, or glass mat that is impregnated with a thermoplastic solvent solution resin which is suitable for solvent-fusing the reinforcement to the sheeting. The structure may be composed either of one layer each of thermoplastic sheeting and fibrous glass or a multiple-layer structure may be formed to hide or mask the irregularities of the glass reinforcing. In the latter situation, the impregnated glass reinforcement is solvent welded or fused to the various layers of thermoplastic sheeting, thereby forming a substantially homogeneous reinforced structure having no interfaces throughout the entire thermoplastic matrix.

The invention will be better understood from the following description and reference to the accompanying drawings, wherein, FIG. 1 is a fragmentary longitudinal cross-sectional view of a thermoplastic tubing reinforcement according to concepts of the existent prior art;

Figure 6:
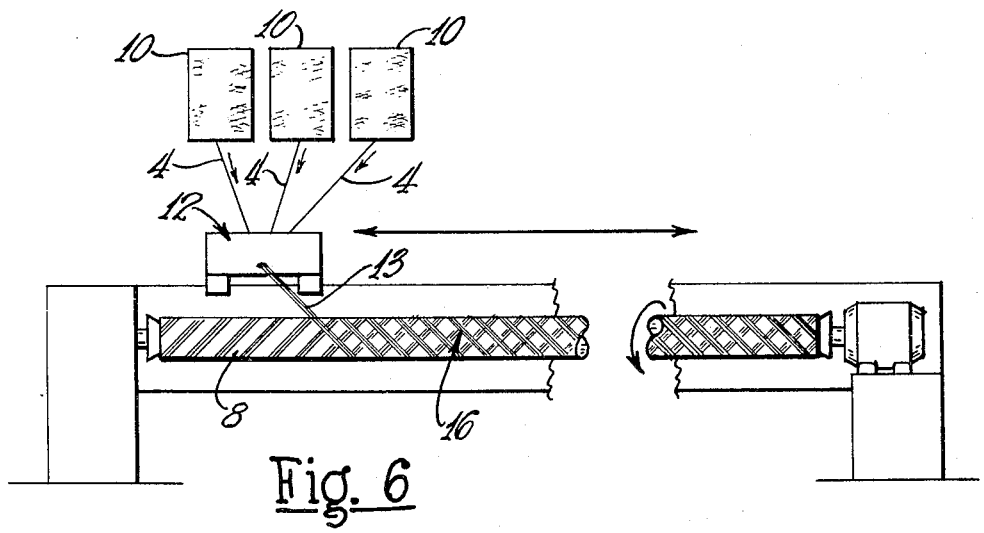
FIG. 6 is a schematic view of a conventional discontinuous lathe type filament winder.

In a discontinuous method for producing an integrally reinforced thermoplastic structure having vastly improved properties, thermoplastic tubing 8 is rotated as shown in FIG. 6. Glass fiber roving 4 is payed off feed rolls 10 and is immersed in a thermoplastic solvent solution resin bath 12 to form impregnated roving 13 which is gathered via a funnel-type die and wound under tension onto the rotating thermoplastic tubing 8. By moving the bath 12 along the length of the rotating thermoplastic tubing 8 and back, the impregnated roving is laid down in a balanced pattern over the thermoplastic tubing. The angle that the impregnated reinforcement makes with the tubing is a function of the linear impregnant bath speed and the angular speed of the thermoplastic tubing.

The thermoplastic tubing 8 is preferably polyvinyl chloride, chlorinated polyvinyl chloride, or acrylonitrile-butadiene-styrene and the thermoplastic resin solvent solution 12 preferably comprises the same material and organic solvent or combinations of solvents. It is preferred to use a solvent or combination of solvents that is capable of taking sufficient thermoplastic resin into solution so that the glass roving 4 remains protected and bonded to the thermoplastic tubing throughout the use of the finished structure. The solvent or combination of solvents must also be capable of attacking the thermoplastic tubing so that no thermoplastic interface results after drying and the solvent must be able to evaporate sufficiently fast at room temperature to allow for quick handling of the reinforced tubing. The above-desired properties were found in a combination of solvents: methyl ethyl ketone and methyl isobutyl ketone in a 1:1 ratio were preferred for the acrylonitrile-butadiene-styrene tubing as well as the polyvinyl chloride tubing, and tetra hydrofuran and dimethyl formamide in a 2:1 ratio were also found suitable for polyvinyl chloride tubing.

Figure 7:
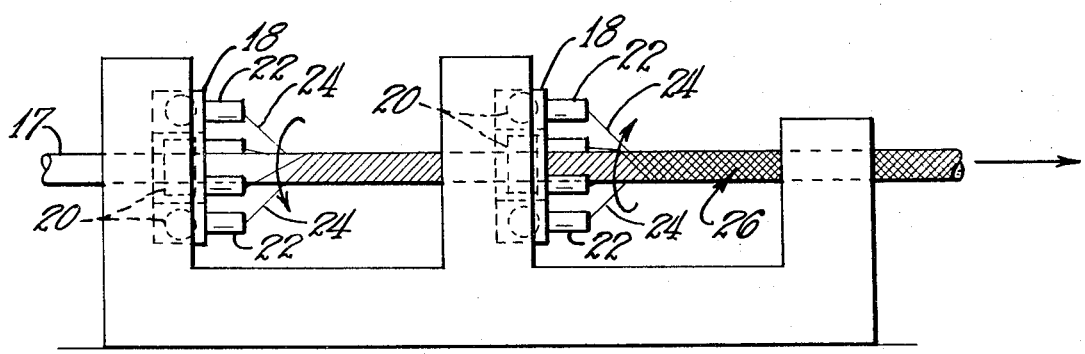
FIG. 7 is a schematic view of a conventional continuous overwrap apparatus.

In a continuous method for producing an integrally reinforced thermoplastic structure as shown in FIG. 7, thermoplastic tubing 17 is moved longitudinally through a series of counterrotating heads 18, which houses a spool(s) of glass roving 20 which passes through a thermoplastic solvent solution resin bath 22 to form impregnated roving 24 which is wound under tension onto the thermoplastic tubing 17. Since the heads 18 rotate in different directions, a balanced pattern is wound onto the thermoplastic tubing 17. The angle that the impregnated reinforcement makes with the thermoplastic tubing is a function of the linear speed of the thermoplastic tubing 17 and the angular speed of the rotating heads 18.

It is seen from the drawings and the description that the inventive concept comprises a substantially all thermoplastic system, interrupted only by the glass roving reinforcement which greatly improves the properties of the system. The improvement in the system, when produced by the inventive concept, lies in the fact that a solvent solution of a thermoplastic resin is used as the impregnant for the glass reinforcement so that when the impregnated roving contacts the tubing, the solvent in the thermoplastic solvent solution resin attacks the tubing to form a temporary interface. This temporary interface has an interrupted life, since after drying it is disappears because the thermoplastic in the impregnant solution and the thermoplastic of the tubing are compatible and become a unified, integral mass.

Figure 1:
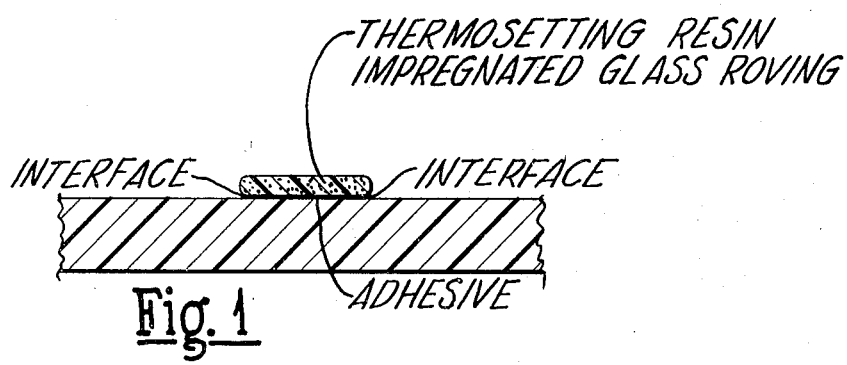

FIG. 1 shows the state of the art immediately before our invention, which discloses glass roving impregnated with a thermosetting resin and a bonding adhesive to bond the impregnated glass to thermoplastic tubing. Because a bonding adhesive is necessary for this system, interfaces are set up in the reinforced article between the thermosetting impregnant and the bonding adhesive and between the thermoplastic article and the bonding adhesive.

Figure 2:
FIG. 2 is a cross-sectional view of a glass-roving impregnated with a thermoplastic solvent solution resin.

FIG. 2 shows a cross-sectional view of a glass roving impregnated with a thermoplastic solvent solution resin. By carefully selecting a solvent or combination of solvents for the impregnant system, sufficient thermoplastic material is taken into solution so that the glass roving is capable of holding sufficient amount of solvent solution resin.

Figure 3:
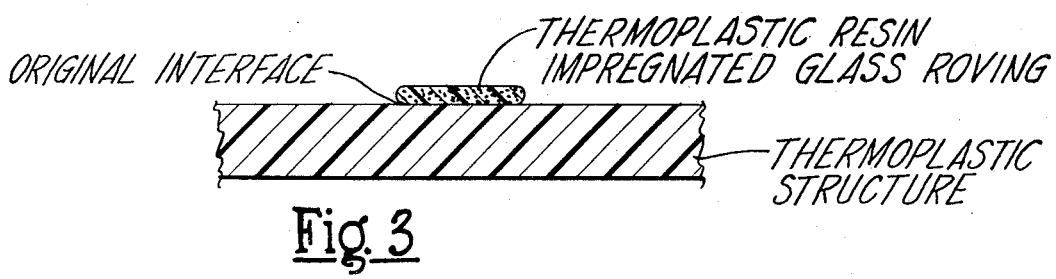
FIG. 3 is a fragmentary longitudinal cross-sectional view of a thermoplastic structure with impregnated glass in contact therewith before solvent attack and subsequent evaporation and curing.

FIG. 3 shows a fragmentary longitudinal cross-sectional view of a thermoplastic article with impregnated glass roving in contact therewith before solvent attack and subsequent evaporation of solvent and drying of the article. An original interface between the impregnated roving and the article is also shown. When the impregnated roving contacts the article the solvent attacks the article to help partially imbed the glass roving therein and further, after the solvent has evaporated from the system, it becomes an integral part thereof.

Figure 4:
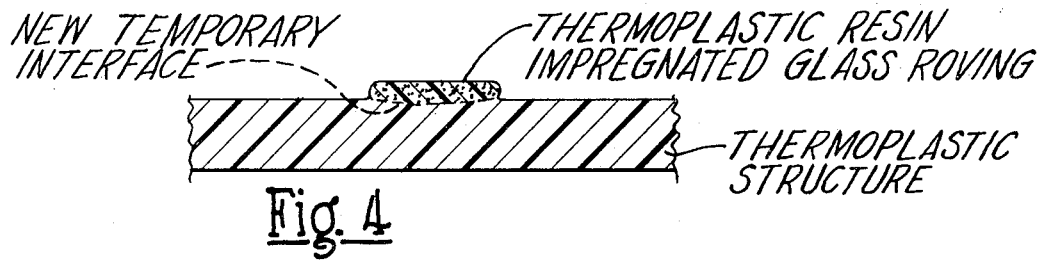
FIG. 4 is a fragmentary longitudinal cross-sectional view of a thermoplastic structure and impregnated glass roving in contact therewith after solvent attack, but prior to drying.

FIG. 4 shows a fragmentary longitudinal cross-sectional view of a thermoplastic article and the impregnated roving after solvent attack, but prior to drying, wherein a temporary interface is formed as a result of the solvent attack on the thermoplastic article.

Figure 5:
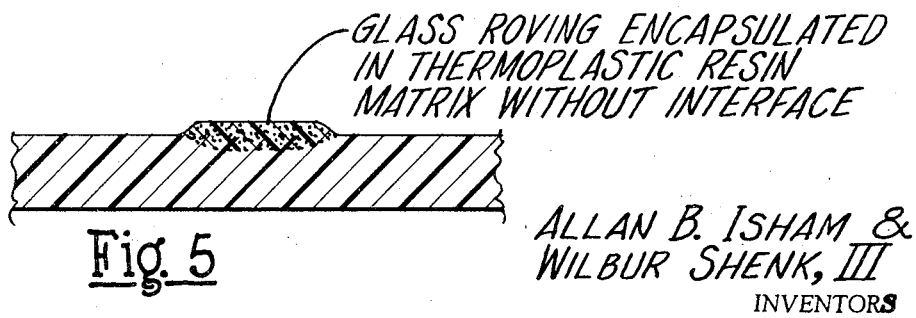
FIg. 5 is a fragmentary longitudinal cross-sectional view of the glass-reinforced structure after drying wherein no interface exists in the thermoplastic matrix.

FIG. 5 shows a fragmentary longitudinal cross-sectional view of the glass-reinforced article after drying wherein no interface exists in the thermoplastic matrix because of the evaporation of the solvent from the impregnant to form a fused, homogenous matrix between the thermoplastic impregnant and the thermoplastic structure, and wherein the glass roving is encapsulated within the homogenous matrix.

The following examples are presented solely for the purpose of further illustrating and disclosing the invention, and are in no way to be constructed as limitations thereon.

Each example was prepared by overwrapping 1 inch nominal outside diameter thermoplastic tubing in a balanced pattern by using an impregnated glass ribbon having a width of about one-eighth inch.

EXAMPLE I

Glass fiber continuous roving, treated with gamma-aminopropyltriethoxysilane was immersed in a bath containing a liquid solution comprising 35 percent acrylonitrile-butadiene-styrene and 67 percent methyl ethyl ketone. The impregnated strand was wiped lightly through a die means as it excited from the bath, and while wet was wound in a helix pattern on an acrylonitrile-butadiene-styrene tubing. The methyl ethyl ketone cut into the tubing and immediately thereafter evaporated from the system thereby leaving the acrylonitrile-butadiene-styrene impregnated roving bonded to the acrylonitrile-butadiene-styrene tubing. No interface appeared in the structure between the impregnant of the reinforcement and the tubing, since the former was solvent fused to the latter and this substantially made the glass reinforcement an integral part of the thermoplastic structure.

Reinforced tubing prepared according to the above method were compared to unwrapped thermoplastic tubing for stress rupture properties. The reinforced structures produced were greatly improved over the unwrapped structures.

EXAMPLE II

Polyvinyl chloride tubing was overwrapped with glass roving impregnated with a thermoplastic solvent solution resin comprising 33 percent polyvinyl chloride and 67 percent methyl ethyl ketone. The impregnated roving was applied to the tubing in a balanced helix pattern. The solvent from the impregnant cut into the tubing and upon evaporating, the impregnant was fused to the tubing, thereby firmly holding the glass roving thereon. The viscosity of the impregnant was about 5,000 centipoise so that conventional filament winding equipment could be used.

On comparing these reinforced tubings to unwrapped tubing, it was found that the burst pressure properties at varying temperatures were vastly improved.

The significance in reinforcing thermoplastic structures (tubing, sheet, etc.) via the solvent-fusing techniques is that in order for the unreinforced structure to perform equally as well, it would cost many times more to increase the thickness of the latter, based on materials and processing costs.

It will be apparent from the foregoing discussion of the instant invention, including the examples, that the invention provides a reinforced thermoplastic article and a method for making the same, comprising a thermoplastic solvent solution resin for use as an impregnant system for continuous glass fibers, so that upon contacting a previously formed thermoplastic article, the solvent from the impregnant attacks the thermoplastic article and fuses the impregnant to the article by the solvent subsequently evaporating therefrom to form a homogeneous thermoplastic matrix containing a glass reinforcement held in a stable condition by the thermoplastic matrix.

It will be apparent however, that various changes and modifications can be made from the details specifically set forth herein without departing from the spirit and scope of the attached claims.

We claim:

1. In a continuous method for reinforcing a previously formed, thermoplastic article comprising the steps of:
    a. advancing the article along a predetermined path;
    b. impregnating a bundle of glass fibers with a fluid material capable of hardening; and
    c. contacting the article with the impregnated glass fiber bundle under tension, the improvement comprising impregnating the bundle of glass fibers with a thermoplastic resin-solvent solution, wherein the resin from the resin-solvent solution is capable of combining with the resin of the article in such a manner that substantially no interface forms between the resinous matrices; controllably contacting the impregnated bundle with the article whereby the solvent from the impregnated bundle softens the outer surface of the article for reception of the impregnated bundle; flashing off solvent from the reinforced article whereby the reinforced article has a substantially homogeneous resinous matrix, which protects and holds the glass fibers to the article.

2. The method of claim 1 wherein the thermoplastic resin-solvent solution comprises a thermoplastic resin, selected from the group consisting of polyvinyl chloride, acrylonitrile-butadiene-styrene, chlorinated polyvinyl chloride, vinyl copolymers and alloys of acrylonitrile-butadiene-styrene and vinyl resins, and at least one organic solvent capable of taking a thermoplastic resin into solution.

3. The method of claim 1 wherein the amount of solvent in the resin-solvent solution ranges from approximately 50–80 percent by weight and the amount of resin therein ranges from approximately 20–50 percent by weight.

4. A method for reinforcing a previously formed thermoplastic article comprising the steps of:
    a. impregnating glass fibers with a solvent solution of a thermoplastic resin;
    b. contacting the article with the impregnated glass fibers, under tension;
    c. controllably contacting the thermoplastic article with the impregnated glass fibers sufficiently, so that a new interface is thereby formed temporarily in the article; and
    d. drying the article by flashing off the solvent from the solvent solution in the impregnated glass fibers whereby the temporary interface disappears upon the fusing of the thermoplastic resin from the solvent solution with the resin from the thermoplastic article to form a homogenous matrix having substantially no interface and which protects and bonds the glass fibers to the article.

5. In a continuous method for reinforcing a previously formed thermoplastic article comprising the steps of:
    a. advancing the article along a predetermined path;
    b. impregnating a bundle of glass fibers with a fluid material capable of hardening without cure; and
    c. contacting the structure with the impregnated glass fibers bundle under tension;

the improvement comprising impregnating the bundle of glass fibers with a thermoplastic resin-solvent solution, said resin-solvent solution comprising from about 20 percent to about 50 percent by weight of a thermoplastic resin selected from the group consisting of polyvinyl chloride, acrylonitrile-butadiene-styrene, chlorinated polyvinyl chloride, vinyl copolymers and alloys of acrylonitrile-butadiene-styrene and vinyl resins, and wherein the improvement further comprises from about 60 percent to about 80 percent by weight of an organic solvent that is capable of taking a thermoplastic resin into solution, said organic solvent being selected from the group consisting of methyl ethyl ketone, methyl isobutyl ketone, tetrahydrofuran, dimethyl formamide, cyclohexanone and combinations thereof.

6. The method as claimed in claim 5 wherein the thermoplastic resin solvent solution impregnant further comprises a filler of from about 5 to 50 percent by weight of the weight of the impregnant, whereby said filler aids in uniform solvent evaporation and prevents blister formation caused by entrapped solvents in the fibrous glass reinforcements.

7. The method as claimed in claim 6 wherein the filler is selected from the group consisting of clays, asbestos fibers, and milled glass fibers.

* * * * *